H. A. LACERDA.
STAY BOLT FOR BOILERS.
APPLICATION FILED SEPT. 19, 1917.
1,304,890.
Patented May 27, 1919.
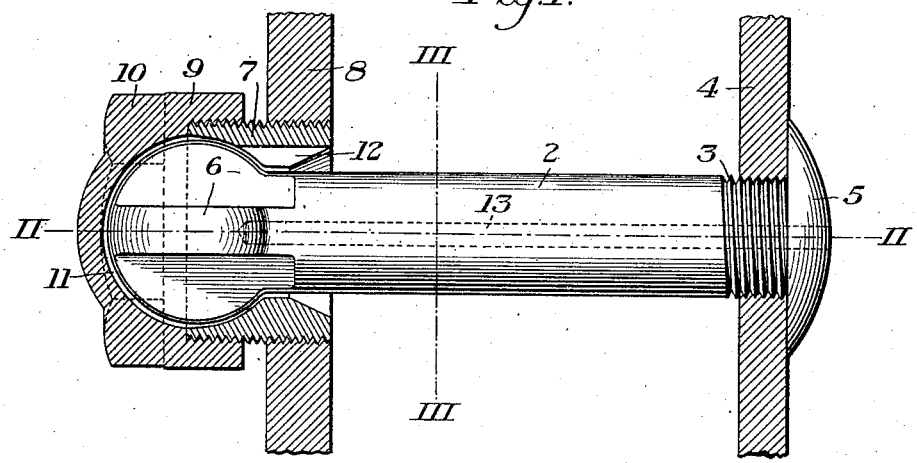
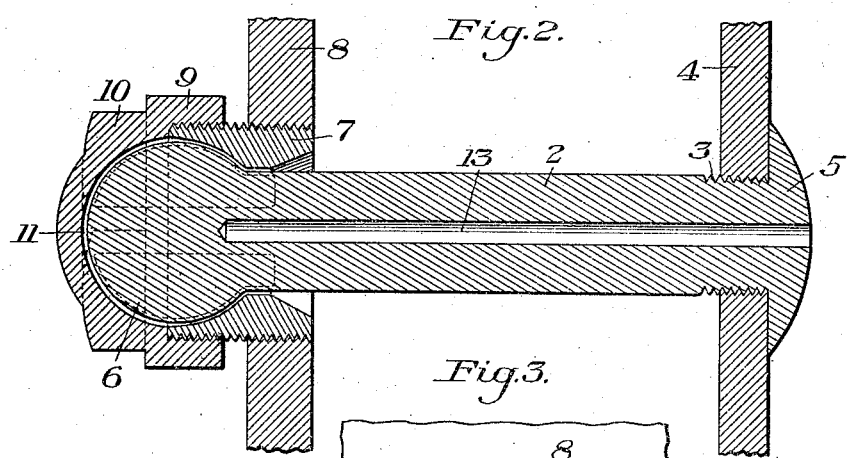
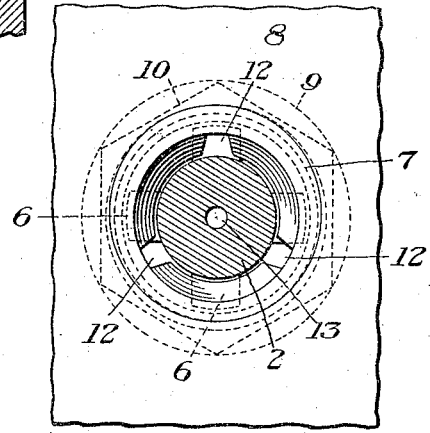
WITNESSES
INVENTOR
H. A. Lacerda

UNITED STATES PATENT OFFICE.

HARRY A. LACERDA, OF SCHENECTADY, NEW YORK, ASSIGNOR TO R. B. G. HAUGHTON, OF PITTSBURGH, PENNSYLVANIA.

STAY-BOLT FOR BOILERS.

1,304,890. Specification of Letters Patent. Patented May 27, 1919.

Original application filed January 24, 1917, Serial No. 144,210. Divided and this application filed September 19, 1917. Serial No. 192,200.

*To all whom it may concern:*

Be it known that I, HARRY A. LACERDA, a citizen of the United States, residing at Schenectady, in the county of Schenectady and State of New York, have invented a new and useful Improvement in Stay-Bolts for Boilers, of which the following is a full, clear, and exact description, reference being had to the accompanying drawings, forming part of this specification.

This invention relates to flexible stay bolts headed at one end, and preferably having a ball and socket joint connection between the head of the bolt and a socket member connected to the outer boiler sheet.

The object of this invention is to provide a new and improved stay bolt for boilers arranged to compensate for the relative movement of the sheets connected thereby, which is caused by expansion, contraction, vibration, etc., and is designed to provide a cheap and efficient stay bolt which will insure a free flexing action at all times by keeping the ball and socket joint free of scale or other foreign matter.

Another object of this invention is to permit of conveniently securing the bolt into the inner boiler sheet as well as for readily securing the socket member to the outer boiler sheet. A still further object is to provide a flexible bolt having means whereby a fracture at any point in its body portion will be at once indicated.

The bolt is provided with a threaded portion at one end which is arranged to engage a threaded opening in the inner boiler sheet, the other end thereof being provided with a head formed of a plurality of radial projections having spherical surfaces for engaging a seat in the sleeve of the socket member. There is a space between the projections as well as an opening or openings in the sleeve which extends through the seat portion and permits a free circulation for water or steam through the socket member which will keep the joint free of scale and other foreign matter.

The precise nature of my invention will be best understood by reference to the accompanying drawings, which will now be described, it being premised, however, that various changes may be made in the details of construction and general arrangement of the parts, without departing from the spirit and scope of my invention as defined in the appended claim.

Figure 1 is a sectional view partially in side elevation of one form of my bolt connecting two boiler sheets to each other.

Fig. 2 is a sectional view on the line II—II of Fig. 1, and

Fig. 3 is a sectional view on the line III—III of Fig. 1.

In the accompanying drawings, the reference character 2 designates the bolt which is provided at its inner end with screw threads 3 which engage a threaded opening in the inner boiler sheet 4. After the bolt has been placed in the position, the end thereof is riveted over to form a head 5 to prevent the bolt from unscrewing. The other end of the bolt is provided with a head formed of radial projections 6 which form a head of cruciform cross section. The exterior surfaces of these projections are spherical and are seated on a spherical seat formed on the interior of a sleeve 7 having a screw threaded connection with the outer boiler sheet 8. This sleeve 7, together with the cap 9 having a screw threaded engagement therewith form the socket member for the head of the bolt 2. This cap is provided with a spherical head engaging portion on its inner face to prevent the outward movement of the bolt, while the outer surface is provided with the exterior polygonal portion 10 which forms a seat for a wrench or similar tool for screwing the cap in place.

The inner surface of the cap 9 is provided with a spherical recess 11 concentric to the spherical portion of the head of the bolt, to form a passage to allow water or steam to pass around the head forming projections to prevent scale or other foreign matter from lodging between the seating portions of the head and the cap.

The sleeve member 7 is provided with a plurality of notches 12 which form passages for the water or steam to the joint between the head and the sleeve 7. Said notches are also adapted to be engaged by a suitably constructed tool for securing the sleeve 7 into its position in the outer boiler sheet 8 without danger of injuring the seat.

From the foregoing it will be seen that by the arrangement described, the bolt can readily be screwed into the inner boiler sheet 4 by applying a suitable tool to the head forming projections without injury to the threaded aperture in the sheet 4 or to the seat engaging portions of the projections.

The provision of an opening between the spherical head of the bolt and the socket member is not only important in permitting the circulation of water and steam to keep the ball and socket joint free of extraneous matter and in a clean active condition, but it also has another highly important function in that it enables the workmen to readily see that the head of each bolt is perfectly seated on the sleeve member when the bolt is put in place. This has not heretofore been possible with any bolt of this type since the spherical head necessarily prevented any inspection of the character of its seating. It has frequently been found that a considerable percentage of stay bolts are not properly seated in the first instance and are therefore useless, the strain being thrown on adjacent bolts. By my construction, and especially with a spherical head of the cruciform shape shown, opportunity is given to accurately determine the initial seating of each bolt head before the cap is screwed on. The form of the head may, however, be widely changed and still provide the necessary inspection opening or openings.

It will further be seen that the sleeve 7 can readily be screwed in place without injury to the threads or the seat therein. When the several parts are in place, a circulating passage is formed between the bolt head and the seat portions in the socket member, which will prevent the lodging of any scale or foreign matter between the spherical face of the projections 6, the seat in the cap 9, or the seat in the sleeve 7, thus keeping the stay bolt in proper flexible condition at all times. By keeping the contacting faces of the spherical surfaces on the projection 6 and the seats in the sleeve 7 and cap 9 in proper condition, the stay bolt readily compensates for the movement of the two sheets of the boiler relative to each other.

The bolt 2 is provided with a tell-tale opening 13 extending through the major portion of the length of the bolt but terminating short of the end surface of the head and hence in case the bolt should break for any reason whatever, water or steam can flow out at the inner end, thus calling attention to the defect. This provision of the tell-tale openings will avoid the necessity of periodically removing the cap 9 at the outer end of the bolt for inspection.

This application is a division of my application, Serial No. 144,210, for stay bolt for boilers, filed January 24, 1917.

I claim:

A stay bolt for boilers and like structures, comprising a bolt and a socket member, the said bolt and socket member having a ball and socket joint connection, and one of said members having a circulating passage for water or steam to keep the ball and socket joint free of extraneous matter and in clean active condition, said socket member having a removable cap, and said cap having an end portion forming a wrench seat; substantially as described.

In testimony whereof, I have hereunto set my hand.

HARRY A. LACERDA.

Copies of this patent may be obtained for five cents each, by addressing the "Commissioner of Patents, Washington, D. C."